April 24, 1962 R. A. DUHAIME ETAL 3,031,127
VACUUM CREATING DEVICES
Filed Dec. 12, 1960

INVENTOR
Raymond A. Duhaime
Stephen W. Leeto
By Worster, Davis & Lilelli
ATTORNEYS

United States Patent Office 3,031,127
Patented Apr. 24, 1962

3,031,127
VACUUM CREATING DEVICES
Raymond A. Duhaime and Stephen W. Lasto, Shelton, Conn., assignors to Air-Vac Engineering Company, Milford, Conn., a corporation of Connecticut
Filed Dec. 12, 1960, Ser. No. 75,194
9 Claims. (Cl. 230—95)

This invention relates generally to vacuum creating devices and more particularly to improvements in devices for utilizing compressed air to create vacuum.

There are an infinite number of practical uses for vacuum, particularly in industrial and laboratory environments. One important use of vacuum in industry is as a source of energy for holding, positioning, lifting, moving or cleaning pieces of work, particularly miniature ones. The utilization of vacuum in manufacturing, assembling, and inspecting operations in industry is an accepted technique. In our copending application Serial No. 715,555, for Vacuum Creating Means Utilizing Compressed Air and Applications Thereof, filed February 17, 1958, we have disclosed and claimed a number of structural embodiments of our basic invention in this field directed toward means for converting compressed air into vacuum and utilizing the latter or making it available for use for a large number of purposes.

It is a principal object of this invention to provide an improved vacuum creating device of the general type disclosed and claimed in our copending application. An improved vacuum creating device contemplated by the present invention comprises a self-contained, vacuum sleeve assembly that is constructed so as to be installed at the point of use by the end user more readily and thereafter operate more efficiently than the devices in our copending application, and which operates in a trouble-free manner after installation.

It is a subsidiary object of the invention to provide an improved vacuum creating device having a housing therefor which is mountable as a unit at any convenient location and to thereby make a vacuum available for general purposes.

The principal object of the invention is accomplished in one form by providing a small, compact, two-part sleeve assembly that may be handled as a unit and mounted in a supporting unit, as by being incorporated into any one of a large number of existing machines, such as metal fabricating machines, or by being mounted in a special housing which is unitary, self-contained and readily disposed at any convenient location for utilization. Regardless of the particular application of the improved sleeve assembly, it requires very little space and a minimum amount of machining to be performed by the ultimate user to install it. Furthermore, the improved sleeve assembly comprises two sleeves that are constructed in a manner so as to be readily but properly assembled, and when assembled both facilitate the easy installation of the assembly and also cooperate to form internal formations which operate in a highly effective and efficient manner when utilized with a source of compressed air as intended.

In accomplishing the foregoing object, applicants provide a vacuum sleeve assembly comprising two, tubular sleeves which are configured and cooperate when assembled so as to provide a unit handled assembly having an elongated, substantially cylindrical, outer periphery with a radially outwardly extending mounting flange at one axial end thereof, which may be readily installed in a supporting unit, such as one of the referred-to machines or special housings, and requires only the provision of a readily machined receiving cavity formed primarily by three, communicating, concentric, cylindrical bores of different diameters. The sleeves are configured so that when assembled they form internal formations, viz., a plurality of communicating and cooperating air passages, air inlet openings and air chambers, and a unique, annular orifice, by themselves, and, further, form another air chamber with one of the bores in the supporting unit in which the assembly is installed, the supporting unit also having an air inlet opening communicating with the latter air chamber being arranged to be connected to a source of compressed air.

A principal advantage of our improved vacuum sleeve assembly resides in the provision of an assembly of sleeves which may accurately be machined on a production basis by the manufacturer, which lend themselves to easy assembly and installation in a supporting unit by the end user and which on installation will be properly positioned relative to each other without reliance on the installer. This advantage flows from the utilization of a pilot fit between portions of the sleeves which comprises an accurately machined, controlled diameter, cylindrical surface on each of the sleeves which cooperate when the sleeves are assembled to fit with no interference but with very little clearance to thereby produce an accurate, pilot fit which is produced by the manufacturer of the sleeves, and which always properly orients the sleeves when they are assembled. In assembling the sleeves, usually by the end user, these cylindrical surfaces readily mate and provide a pilot fit that properly and accurately assembles the sleeves so as to provide the proper internal formations in the sleeve assembly. In the utilization of the improved vacuum sleeve assembly proper assembly is not dependent on the manner in which the assembly is installed by the end user, but is "built into" the sleeves themselves, and therefore, it is not necessary to rely on the end user to accurately install the vacuum sleeves to properly form the internal formations.

In accomplishing the principal object of the invention, in order to provide a more efficiently operating, vacuum sleeve assembly, we have developed a particular structural relationship of internal formations, i.e. air passages, openings and chambers, and particularly a unique, annular orifice which is formed partially by each of the sleeves of the vacuum sleeve assembly which automatically cooperate when assembled to provide this orifice. In view of the fact that it is essential to maintain this orifice properly dimensioned and disposed internally of the sleeve assembly, it is extremely important that the sleeves be constructed by the manufacturer, as set forth in the preceding paragraph, so as to insure their assembly at the point of installation by the end user so as to properly form the orifice.

Further objects and further details of that which we believe to be novel and our invention will be clear from the following description and claims taken with the accompanying drawing wherein:

Figure 1:
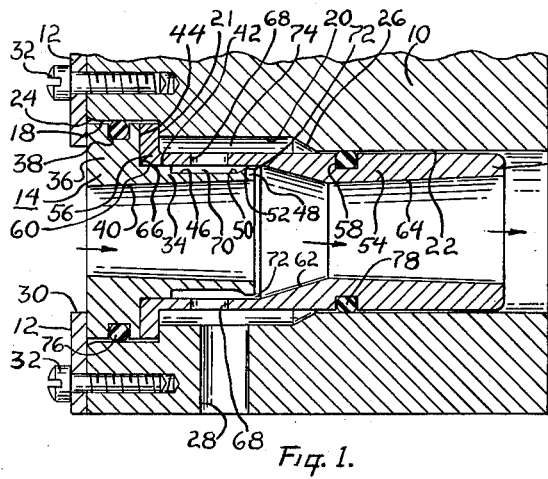
FIG. 1 is a longitudinal sectional view taken through our improved vacuum sleeve assembly illustrated as mounted in a supporting unit.
Figure 3:
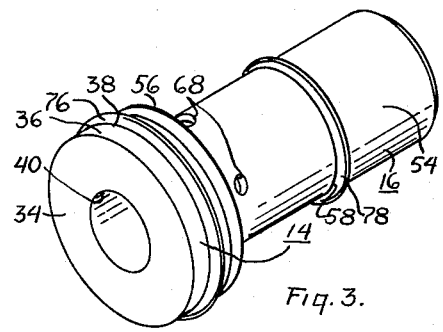
FIG. 3 is a perspective view of our improved vacuum sleeve assembly shown prior to installation in a supporting unit.
Figure 4:
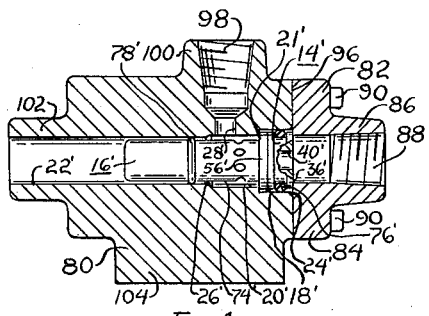
FIG. 4 is a vertical sectional view through a self-contained housing for our improved vacuum sleeve assembly with the latter illustrated therein principally in elevation.
Figure 5:
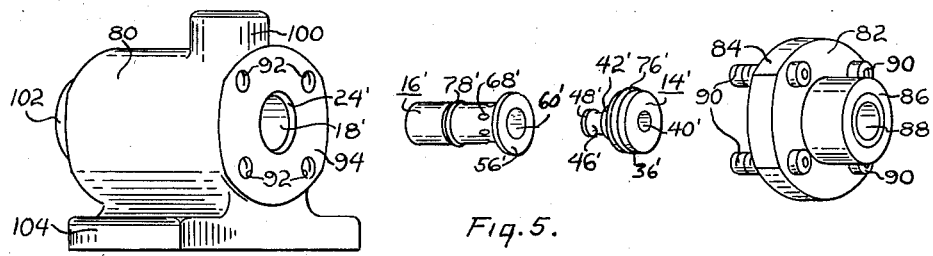
FIG. 5 is an exploded view of the FIG. 4 assemblage.

In FIG. 1 our improved vacuum sleeve assembly is illustrated as assembled and mounted in a supporting unit 10 which is not shown in much detail, because it may comprise either a machine into which the assembly is incorporated, such as a fabricating machine wherein it is to be used to either remove scrap material or hold pieces of work in place (numerous examples of which are disclosed in our copending application), or a special, general purpose housing, such as liluustrated in FIGS. 4 and 5. For purposes of simplicity in disclosure, the supporting unit 10 in FIG. 1 is illustrated only generally along with a detachable retainer 12 for housing our improved vacuum sleeve assembly. Our improved vacuum sleeve assembly includes two, separate, tubular sleeves 14 and 16 which are readily assembled to each other in a manner to be described in greater detail subsequently, so as to form a unit-handled, vacuum sleeve assembly, shown by itself in FIG. 3, which is bodily disposed in a cavity formed in the supporting unit 10, and retained therein by the retainer 12.

The cavity in the supporting unit 10 essentially comprises three cylindrical bores 18, 20 and 22, each of uniform but of lesser diameter, which are concentric and communicate with each other. The mouth of the largest bore 18 is flared at 24, and the bores 20 and 22 are connected by a flared portion 26, the flares being for the purpose of facilitating physical insertion of the vacuum sleeve assembly into the cavity after the retainer 12 is removed. Bores 18 and 20 are connected by a flat, annular, radial shoulder 21, which aids in positioning the vacuum sleeve assembly. At one side of the supporting unit 10, an air inlet opening 28 is formed which at its inner end intersects the bore 20 intermediate the axial extent thereof and its outer end is arranged to have a conduit connected to it. After the vacuum sleeve assembly is fully inserted into the cavity in the supporting unit, retainer 12, which may conveniently take the form of a plate-like member having an opening 30 formed therein, is detachably secured to the supporting unit by securing means, such as machine screws 32, to retain the assembly in the supporting unit. Retainer 12 may be an independent member or part of an element of the machine or special housing, if desired. The remainder of the supporting unit 10 forms no specific part of our invention and, therefore, will not be discussed further. However, it is important to note at this point that the supporting unit 10 and retainer 12, if formed as a part of a machine into which our improved vacuum sleeve assembly is to be incorporated, are normally in the possession of an end user or the manufacturer who produces the machine. Therefore, it is contemplated by our invention that the manufacturer of our improved vacuum sleeve assembly will not normally have any control over the installation of the vacuum sleeve assembly into the machine. It is the conscious intent of applicants and a vital aspect of their invention to provide an improved vacuum sleeve assembly which requires a minimum of effort for installation by the end user and which does not rely on the installer for the proper orientation of the sleeves which comprise the vacuum sleeve assembly. It will, therefore, be noted that it is only necessary for the installer to provide a proper cavity, as described above, comprising essentially only three concentric, communicating, cylindrical bores, dimensioned as recommended by the manufacturer of our improved, vacuum sleeve assembly, depending on the particular vacuum capacity assembly employed, but the dimensions of which are not critical.

Figure 2:
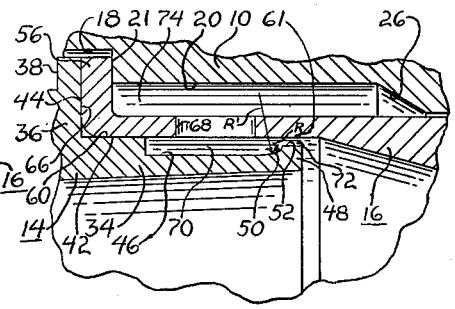
FIG. 2 is an enlarged view of a portion of FIG. 1.

Our improved vacuum sleeve assembly comprises the two, referred-to sleeves 14 and 16 which are individually machined on a production basis by the manufacturer and then shipped to the end user and assembled by him to form a separable, unit-handled assembly which is shown by itself in FIG. 3 and installed by him. The sleeve 16 might be referred to as a "vacuum" sleeve, because it is arranged to communicate with the point where vacuum is desired, as will become apparent; however, in view of the fact that it is uniquely configured so as to provide for the referred-to, highly important, annular orifice, which will be hereinafter called a "gap," the sleeve 14 has been designated as the "gap" sleeve. The sleeve 16 is arranged to communicate with the point of discharge, as will become apparent, and therefore, has been designated the "exit" sleeve. As will become apparent, the flow of air through the vacuum sleeve assembly when mounted in a supporting unit and operated is from left to right in FIGS. 1, 2 and 3, as indicated by the schematic arrows passing through the vacuum sleeve assembly in FIG. 1, hence the left of these figures will be referred to as "upstream" and the right as "downstream."

The gap sleeve 14 comprises a short, generally tubular body 34 having a relatively wide, radially outwardly extending flange 36 formed at one axial end thereof. In the periphery of the flange 36 there is formed a circumferential groove 38 into which an O-ring may be seated which functions as a seal for the assembly when the latter is mounted in a supporting unit, as will become apparent.

A slightly tapered passage 40 extends completely through the gap sleeve body 34 with its larger diameter formed at the downstream end of the passage. The gap sleeve body 34 includes a precisely controlled diameter, outer cylindrical surface 42 which intersects the flat, radial, inner surface 44 of the flange 36. Adjacent the cylindrical surface 42, which comprises a part of the referred-to pilot fit, there is formed in the gap sleeve body 34 an external, circumferential groove 46 that extends axially toward but short of the free end of the gap sleeve body. A radially outwardly extending, flange-like, annular lip 48 is formed at the free end of the gap sleeve body. The downstream end of the groove 46 flares radially outwardly at the upstream side of the lip 48 to smoothly merge therewith at 50. As can best be seen in FIG. 2, a cross-section of the flare 50 is formed by double radii R and R', the former shorter than the latter, to provide a smoothly, outwardly curving flare from the axially extending base of the groove 46 to the radially outer edge of the lip 48, which comprises a narrow, cylindrical, outer wall 52 of a diameter which is less than that of the cylindrical surface 42.

The exit sleeve 16 comprises an elongated, generally tubular body 54 having a thin, radially outwardly extending flange 56 formed at one axial end thereof. The exterior of the body 54 is uniformly cylindrical other than for the flange 56, and a circumferential groove 58, which is arranged to receive a sealing O-ring. An elongated passageway extends axially completely through the exit sleeve 16 and comprises three main portions, a cylindrical portion 60, an inwardly tapered portion 62, and a slightly outwardly tapered portion 64. The free, flat, radial surface 66 of the flange 56 and the adjacent part of the cylindrical portion 60 of the exit sleeve passageway comprise means for properly positioning the exit sleeve on the gap sleeve. The cylindrical portion 60 has a precisely controlled diameter and a part of it immediately adjacent the flange 56 comprises the other part of the referred-to pilot fit. A plurality of circumferentially spaced, radially extending, air inlet openings 68 are formed in the exit sleeve body 54 and disposed to intersect with the cylindrical portion 60 adjacent the part thereof which is part of the pilot fit.

The sleeves 14 and 16 are assembled by moving them toward each other and sliding the pilot surface 60 of the exit sleeve onto the pilot surface 42 of the gap sleeve, until they completely nest and are disposed as illustrated in FIGS. 1–3. In this state of assembly, the vacuum sleeve assembly is complete and may be handled as a selfcontained unit, as illustrated in FIG. 3. When so assembled, a number of internal formations are formed through the structural cooperation of portions of the sleeves. It should be carefully noted at this point that all of these internal formations are properly formed automatically as a result of the exit sleeve pilot surface 60 having a pilot fit on the gap sleeve pilot surface 42. The pilot fit involves very little clearance, but no interference, and along with the abutment of the facing, flat surfaces 44 and 66 of the flanges 36 and 56, respectively, results in proper positioning of the sleeves. The referred-to, internal formations comprise an annular air chamber 70 that is formed by the gap sleeve groove 46 and the portion of the exit sleeve surface 60 which is disposed radially outwardly thereof. Air chamber 70 communicates with the exterior of exit sleeve body 54 through the radial, air inlet openings 68, and communicates with the zone formed at the downstream end of the gap sleeve body 34 within the tapered portion 62 of the exit sleeve passageway through a very narrow, annular orifice 72, which is herein referred to as a gap. Gap 72 is formed by the narrow, cylindrical wall 52 of lip 48 and an axial, cylindrical portion 61 of the exit sleeve surface 60 which is downstream of air inlet openings 68. In addition to forming the air chamber 70 and gap 72, the sleeves when assembled also form a through passageway that extends axially through the assembly and which comprises a vacuum passage defined by the gap sleeve, tapered passage 40 and the exit sleeve tapered portions 62 and 64.

When our improved, vacuum sleeve assembly is assembled and mounted in a supporting unit, such as unit 10, having the previously described, triple bore cavity formed therein, the exit sleeve cooperates with the supporting unit to form a second, annular, air chamber 74 which is spaced concentrically about the air chamber 70 and communicates therewith through the radial, air inlet openings 68. Air chamber 74 has a substantially greater axial extent and volume than the air chamber 70. It will be observed that air chamber 74 is specifically formed in part by a portion of the periphery of exit sleeve body 54, the exit sleeve flange 56 and the bore 20 of the supporting unit 10. The air inlet opening 28 communicates with the chamber 74, and the latter is sealed by the O-rings 76 and 78 which are disposed, respectively, in the grooves 38 and 58, and are biased into sealing engagement with portions of the bores 18 and 22, respectively. After the sleeves 14 and 16 are assembled and inserted into the cavity in the supporting unit, as just described, the retainer 12 is re-attached to the supporting unit, and as will become apparent from an inspection of FIG. 1, the assembly is rigidly mounted in the supporting unit by virtue of its contiguous, cooperating flanges 36, 56 being locked in the portion of the cavity formed by bore 18 between shoulder 21 and retainer 12.

The full significance of the previously functionally designated elements will now become apparent. In operation, a source of compressed air is attached to the air inlet opening 28 and the compressed air flows radially inwardly through air inlet opening 28 into the rather large volume, outer, annular, air chamber 74 and circumferentially about a portion of exit sleeve body 54, then radially inwardly through the radial, air inlet openings 68 into the inner, annular, air chamber 70 circumferentially about groove 46 in gap sleeve body 34, then axially downstream through the gap 72 and into and through the zone formed at tapered portion 62 and out through tapered portion 64 of the exit sleeve body 54. This flow of air creates a substantial vacuum in the referred-to zone at the downstream side of the gap 72 within the tapered portion 62, and this vacuum zone induces a flow of air through the vacuum passage 40 in the gap sleeve body 34. It should be understood that an appropriate conduit may be connected to the upstream end of the vacuum passage 40 and led to the point where vacuum is desired, depending upon the vacuum function to be effected. It will also be understood that the downstream end of the bore 22 in the supporting unit may also be connected to a conduit which may be led to the point where discharge is effected, depending upon the function to be accomplished. If scrap is being removed, it may be led to point of scrap collection. If solid material is not being forced through the assembly, the discharge conduit may be connected to an air filter and/or air muffler.

It should be eminently clear from the foregoing that we have provided an improved, vacuum sleeve assembly which may accurately be machined by the manufacturer and which through the utilization of a pilot fit effected by surfaces 42 and 60, provides for the proper positioning of the sleeves relative to each other regardless of the manner in which the entire vacuum sleeve assembly is installed by the end user, and thereby eliminates reliance on the installer for proper positioning of the sleeves relative to each other. It will also be apparent that the cavity formed in the supporting unit by the end user may have considerable tolerences largely as a result of the utilization of O-rings and the lack of reliance on the cavity to properly position the sleeves, hence the absence of slip or slight interference fits which have heretofore been relied on for this purpose; therefore, installation of our improved, vacuum sleeve assembly is a relatively simple matter. It may not be as readily apparent, however, as to why our improved, vacuum sleeve assembly operates more efficiently than the devices in our copending application.

The construction and disposition of the internal formations formed in our improved, vacuum sleeve assembly are such as to provide for maximum operating efficiency, that is, creating the greatest vacuum possible within the limitations imposed by the size of the vacuum sleeve assembly and the amount of compressed air utilized. In large measure, maximum operating efficiency is achieved by correctly positioning and sizing the gap 72, for it is the changes in the velocity and pressure of the air effected by the gap 72 which result in the creation of a maximum vacuum at the vacuum zone. In view of the fact that the sleeves are accurately and properly positioned by the referred-to pilot fit, and that the gap 72 is formed partially by the cylindrical wall 52 on the gap sleeve lip 48 and partially by an axial portion 61 of cylindrical wall 60 immediately upstream of the tapered portion 62 of the exit sleeve passageway, the proper gap length and the proper concentricity of the cylindrical portions forming the gap are correctly positioned and sized. It should be carefully noted that the gap 72 is annular, is formed by relatively large diameter cylindrical surfaces and is extremely narrow radially. The narrow gap substantially restricts the flow of air and thereby conserves it, yet it renders a great change on it by causing it to flow with high velocity and rapidly expand in the vacuum zone.

Although the proper formation of the gap 72 is of utmost importance, the other formations on the upstream side of the gap are also very important. For example, no section of space preceding the gap 72 is of less area than the gap 72. Also the air chamber 70 has been designed to provide a reservoir of air under pressure at low velocity which maintains a constant flow of air under pressure through the gap 72. In this regard, it is extremely important that the amount of resistance to the flow of air be maintained at a minimum and that turbulence be minimized to the greatest extent. It has been found in practice that the double radii flare 50 provides a smooth entrance to the gap 72 from air chamber 70, which minimizes turbulence and provides for a smooth flow of air thereto. Air is fed to the air chamber 70 from the air chamber 74 through the air inlet openings 68, and air is fed to the air chamber 74 from the source of compressed air through the air inlet opening 28. The condition of the air as it flows from the source through the air inlet opening 28 to the air chamber 70 is as follows: Compressed air flows through the air inlet opening 28 into the air chamber 74 which is sufficiently large to permit the air to readily and quickly flow around the portion of exit sleeve body 54 which defines in part air chamber 74. The air expands slightly in air chamber 74 and, therefore, its velocity diminishes slightly and the pressure increases slightly relative to the condition of the air in air inlet opening 28. In this regard, it should be noted that the size of air inlet opening 28 is sufficient to permit the quick and easy flow of a substantial quantity of air into the air chamber 74. The air flows from air chamber 74 radially inwardly through the air inlet openings 68 into air chamber 70. Air passing through the openings 68 has its velocity increased and its pressure reduced, but on entering the air chamber 70 its its velocity is substantially decreased and its pressure substantially increased, thereby maintaining a substantial constant pressure in air chamber 70 which results in a high velocity, uniform flow of air through the gap 72 into the vacuum zone and out through the portions 62 and 64 of the exit gap passageway.

FIGS. 1–3 illustrate and the above describes our improved, vacuum sleeve assembly. As point out above, it may be housed in a supporting unit which is either the machine itself into which it is to be incorporated, or in a self-contained, bodily handled, special housing. FIGS. 4 and 5 illustrate our improved, vacuum sleeve assembly in structural association with such a special housing, which will be hereinafter referred to as a "transducer." The transducer is a two-piece, housing assembly comprising a main body 80 and an end retainer 82 which are detachably secured to each other and internally configured so as to accommodate our improved, vacuum sleeve assembly. The main body 80 includes a cavity for receiving our improved, vacuum sleeve assembly which is generally similar to the cavity illustrated in supporting unit 10 in FIG. 1, and its corresponding portions to those of the cavity in supporting unit 10 will be designated by the same reference numerals as used in FIG. 1 with a prime (') attached, and the vacuum sleeve assembly will also be similarly designated.

In FIGS. 4 and 5, our improved vacuum sleeve assembly comprising gap sleeve 14' and exit sleeve 16' is inserted into the cavity in the main body 80 formed by the bores 18', 20', and 22', the flares 24' and 26' and the shoulder 21'. The end retainer 82 includes a mounting flange 84 and a projection 86, and includes a through passage 88. The end retainer 82 is secured to the main body 80 by securing means, such as a plurality of machine screws 90 which are anchored in threaded bores 92 formed in the main body 80 and which open through a radial, flat face 94 formed at one end thereof. The diameter of the passage 88 at the radial face 96 of the flange 82 is smaller than the outer diameter of the flange 36' of the gap sleeve 14', and therefore, retains the entire vacuum sleeve assembly in the transducer by locking the flanges 36' and 56' between the shoulder 21' and the retainer face 96. A portion of the passage 88 in the end retainer 82 within the projection 86 may be threaded, as illustrated, to receive a connection fitting from a conduit, that may conveniently take the form of flexible tubing, which comprises the vacuum line that may be led to the point where vacuum is desired. In the main body 80, the main air inlet opening is designated 28', and it is illustrated as communicating with an enlarged, threaded bore 98 formed in a projection 100. A connection fitting from a conduit, which also may conveniently take the form of flexible tubing, may be detachably connected to the threaded bore 98 and the conduit led to a source of compressed air, which may be any conventional source. In FIGS. 4 and 5, the flow of air is from right to left. The downstream end of the bore 22' at the enlargement 102 may, if desired, be threaded and receive a connection fitting for a discharge conduit, though it is illustrated as being plain. If desired, this downstream end may communicate with an air filter and/or an air muffler. The main body 80 also includes a mounting base 104, which may be formed with appropriate openings through which securing means, such as machine screws (not illustrated) may be inserted and thereby enable the entire transducer to be mounted at any convenient location.

The pricipal advantage of the FIGS. 4 and 5 supporting unit is that it imparts a great deal of versatility to our vacuum sleeve assembly, in that it permits our vacuum sleeve assembly to be utilized as a self-contained, bodily handled, unit, which may be mounted at any convenient location and connected to a source of compressed air, and which thereafter may be utilized for an infinite number of purposes. For example, it may be utilized as a source of energy for vacuum-operated probe tools of the type disclosed and claimed in our copending application Serial No. 842,735, entitled Vacuum Operated Probe Tools, filed September 28, 1959. Reference to that patent application will reveal the large number of uses and advantages of such vacuum-operated probe tools which may be conveniently and effectively powered by one of our vacuum sleeve assemblies mounted in a transducer by being connected to the vacuum line thereof. There are, of course, many other uses and applications for a transducer mounted, vacuum sleeve assembly. It could be used in association with any number of machines to supply vacuum for whatever purpose is needed therein.

It will be apparent from the foregoing that we have provided an improved vacuum sleeve assembly which is highly efficient in operation, and which involves a minimum amount of effort and accuracy on the part of the installer. It will also be apparent that the invention permits the manufacture of the two major elements of our improved vacuum sleeve assembly on a highly precise, yet production, basis, and does not rely on any appreciable extent on the end user to properly assemble the sleeves in order to produce the proper gap in the assembly. It will further be apparent that by utilizing the O-ring seals in association with the pilot fit of the sleeves, rather large tolerances are permitted the installer in installing our improved vacuum sleeve assembly in a supporting unit. Regardless of whether our improved vacuum sleeve assembly is incorporated in an existing machine or mounted in a transducer, it lends itself to ready disassembly as for the purpose of cleaning the elements thereof.

As will be evident from the foregoing description, certain aspects of our invention are not limited to the particular details of construction of the examples illustrated, and we contemplate that various and other modifications and applications will occur to those skilled in the art. It is, therefore, our intention that the appended claims shall cover such modifications and applications as do not depart from the true spirit and scope of our invention.

What we claim as new and desire to secure by Letters Patent of the United States is:

1. A vacuum creating assembly comprising: a gap sleeve having an axially extending tubular body with a radially extending mounting flange located at one axial end thereof; a vacuum passage extending axially completely through said gap sleeve body; the outer circumferential surface of said gap sleeve body including an axially extending cylindrical pilot surface adjacent to and of lesser diameter than said flange, a cylindrical portion of reduced external diameter relative to and located immediately adjacent said cylindrical pilot surface and extending axially toward but short of the other axial end of said gap sleeve body, and a narrow radially extending flange terminating in a narrow cylindrical surface of lesser diameter than said cylindrical pilot surface located immediately adjacent said reduced portion at said other axial end of said gap sleeve body; and an exit sleeve having a tubular body with a generally cylindrical outer circumferential surface and a radially extending mounting flange located at one axial end thereof; a passageway extending axially completely through said exit sleeve body; an axial portion of said passageway of said exit sleeve body adjacent the mounting flange being cylindrical and forming a pilot surface that is dimensioned to cooperate with the cylindrical pilot surface on said gap sleeve body so as to provide a pilot fit between the sleeves for permitting assembly of them into a unitary vacuum creating assembly with the flanges of the sleeves adjacent each other and said exit sleeve body extending around an axial portion of said gap sleeve body and axially beyond said other end of said gap sleeve body; a second axial portion of said passageway of said exit sleeve body located immediately adjacent the pilot surface portion thereof being cylindrical and radially outwardly spaced from and extending axially beyond the reduced portion and narrow radially extending flange of the outer circumferential surface of said gap sleeve body, and being dimensioned relative to said reduced portion and the last mentioned flange so as to cooperate therewith to form an annular air chamber and a narrow annular cylindrical orifice; a plurality of circumferentially spaced radially extending air inlet openings formed in said exit sleeve body at said second portion; and the remainder of the passageway in said exit sleeve body axially beyond said gap sleeve body comprising a discharge passage including a vacuum zone adjacent said gap sleeve body.

2. A vacuum creating assembly as defined in claim 1 wherein the axial part of the reduced portion of the outer circumferential surface of the gap sleeve body immediately adjacent the narrow radially extending flange is smoothly radially outwardly curved.

3. A vacuum creating assembly as defined in claim 1 wherein an annular circumferential groove is formed in the periphery of the flange of said gap sleeve body; and an annular circumferential groove is formed in the outer surface of said exit sleeve body; whereby O-rings may be individually mounted in said grooves.

4. A vacuum creating assembly as defined in claim 1 wherein said zone is formed by a radially inwardly tapered portion of said discharge passage.

5. A vacuum creating assembly as defined in claim 1 wherein said vacuum passage is tapered slightly radially outwardly axially from said one to said other end thereof; and said discharge passage other than for said zone is tapered generally similarly in the same direction.

6. A vacuum creating assembly as defined in claim 1 which further includes a housing having an elongated passageway made of a plurality of cylindrical axial sections of different diameters that are concentric and arranged to receive and support said sleeves when they are assembled in a unitary assembly; said housing passageway including an intermediate section disposed axially adjacent and radially outwardly spaced from said second axial portion of said exit sleeve body, and dimensioned relative thereto and cooperating therewith to form a second annular air chamber which is of larger volume than and disposed concentrically about the first mentioned air chamber and communicates therewith through said air inlet openings; and an inlet passage formed in said housing and communicating with said intermediate section.

7. A vacuum creating assembly as defined in claim 6 wherein said housing comprises a self-contained construction that includes means for mounting it bodily to a support at any convenient location.

8. A vacuum creating assembly as defined in claim 7 wherein said construction comprises two detachably secured parts; and includes a plurality of passages which individually communicate with said vacuum passage and said discharge passage.

9. A vacuum creating assembly as defined in claim 6 wherein an annular circumferential groove is formed in the periphery of the flange of said gap sleeve body; an annular circumferential groove is formed in the outer surface of said exit sleeve body; and a resilient sealing O-ring is disposed in each of said grooves and biased into air sealing contact with wall portions of said housing which form said housing passageway on opposite axial sides of said second air chamber.

References Cited in the file of this patent

UNITED STATES PATENTS 2,582,069    Rose _____ Jan. 8, 1952